United States Patent
Xiong et al.

(10) Patent No.: US 8,542,947 B2
(45) Date of Patent: Sep. 24, 2013

(54) METHOD FOR RPC REFINEMENT USING GROUND CONTROL INFORMATION

(75) Inventors: Zhen Xiong, Fredericton (CA); Yun Zhang, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 416 days.

(21) Appl. No.: 12/775,259

(22) Filed: May 6, 2010

(65) Prior Publication Data

US 2010/0284629 A1 Nov. 11, 2010

Related U.S. Application Data

(60) Provisional application No. 61/175,944, filed on May 6, 2009.

(51) Int. Cl.
*G06K 9/54* (2006.01)
*G06K 9/32* (2006.01)

(52) U.S. Cl.
USPC ............................ 382/293; 382/154; 382/285

(58) Field of Classification Search
None
See application file for complete search history.

(56) References Cited

U.S. PATENT DOCUMENTS

| | | | |
|---|---|---|---|
| 2003/0044085 A1* | 3/2003 | Dial et al. | 382/293 |
| 2004/0122633 A1* | 6/2004 | Bang et al. | 703/2 |
| 2005/0140784 A1* | 6/2005 | Cho et al. | 348/147 |
| 2005/0147324 A1* | 7/2005 | Kwoh et al. | 382/293 |
| 2005/0259890 A1 | 11/2005 | Lutes et al. | |
| 2007/0189598 A1* | 8/2007 | Chen et al. | 382/154 |

OTHER PUBLICATIONS

Xiong, Zhen and Zhang, Yun, "A Generic Method for RPC Refinement Using Ground Control Information," Photogrammetric Engineering & Remote Sensing, vol. 75, No. 9, Sep. 2009, pp. 1083-1092.*

Zhang, Yun and Xiong, Zhen, "Moving Vehicle Detection Using a Single Set of Quickbird Imagery—an Initial Study," Int. Arch. Photogramm. Remote Sens. Spatial Inform. Sci., vol. 36, 2006, pp. 397.*

Hanley and Fraser, "Sensor orientation for high-resolution satellite imagery: further insights into bias-compensated RPC" 2004.*

Grodecki, "Ikonos stereo feature extraction-RPC approach," Proc. ASPRS Annual Conference, St. Louis, Apr. 23-27, 2001, American Society of Photogrammetry & Remote Sensing.*

Grodecki and Dial, "Block Adjustment of High-Resolution Satellite Images Described by Rational Polynomials," Photogrammetric Engineering & Remote Sensing, vol. 69, No. 1, Jan. 2003, pp. 59-68.*

Bang Ki In, Soo Jeong, Kyung-Ok Kim. "Modification of sensor model parameters with a few GCP." ASPRS 2003 annual conference proceedings, May 2003, Anchorage, Alaska.

(Continued)

*Primary Examiner* — Barry Drennan
*Assistant Examiner* — Andrew Moyer
(74) *Attorney, Agent, or Firm* — Eugene E. Derényi; Fogler, Rubinoff LLP

(57) ABSTRACT

A computer implemented method of adjusting original rational polynomial coefficients of an RPC model for an image acquired by an image sensor comprising providing rational polynomial coefficients associated with the image calculating a pseudo position and attitude angles for the sensor using the original coefficients providing at least one ground control point associated with the image adjusting the pseudo position and attitude angles using the at least one ground control point; and adjusting the original coefficients for the image using the adjusted pseudo position and attitude angles.

14 Claims, 12 Drawing Sheets

(56) References Cited

OTHER PUBLICATIONS

Chen Liang-Chen, Tee-Ann Teo, and Chien-Liang Liu. "The geometrical comparisons of RSM and RFM for FORMOSAT-2 satellite images." (2006). Photogrammetric Engineering & Remote Sensing, pp. 573-579, vol. 72, No. 5.

Di Kaichang Ruijin Ma, and Rong Xing Li. "Rational functions and potential for rigorous sensor model recovery." Photogrammetric Engineering & Remote Sensing, (2003). pp. 33-41, vol. 69, No. 1.

Dial Gene and Grodecki Jacek. "Block adjustment with rational polynomial camera models." ACSM-ASPRS 2002 annual conference proceedings. (2002a).

Dowman Ian and Vincent Tao. "An Update on the use of rational functions for photogrammetric restitution." ISPRS Article, vol. 7, No. 3, Sep. 2002. URL: http://www.iprs.org/publications/highlights/highlighhts0703/22 HL 09 02 Article_Dowman.pdf, last date accessed Jan. 6, 2008.

Fraser Clive S. and Harry B. Hanley. "Bias Compensation in Rational Functions for Ikonos Satellite Imagery." Photogrammetric Engineering & Remote Sensing, (2003). pp. 53-57., vol. 69, No. 1.

Fraser Clive S. and Harry B. Hanley. "Bias-compensated RPCs for Sensor Orientation of High-resolution Satellite Imagery." Photogrammetric Engineering & Remote Sensing, (2005). pp. 909-915, vol. 71, No. 8.

Grodecki Jacek and Gene Dial. "Block adjustment of high resolution satellite images described by rational polynomials." Photogrammetric Engineering & Remote Sensing, (2003). pp. 59-68, vol. 69, No. 1.

Grodecki Jacek. "IKONOS stereo feature extraction-RPC approach." Proceedings of ASPRS 2001 Conference, St. Louis, Apr. 23-27, 2001. URL: http://www.geoeye.com/whitepapers_pdfs/2005/IKONOS%20Geometric/%20Calibrations%20-%2OASPRS%202005%20 final.pdf, last date accessed Dec. 31, 2007.

Hu Yong and C. Vincent Tao. "Updating solutions of the rational function model using additional control information." Photogrammetric Engineering & Remote Sensing, (2002). pp. 715-723, vol. 68, No. 7.

Hu Yong, Tao Vincent, Arie Croitoru. "Understanding the rational function model: methods and applications." (2004). URL: http://www.geoict.net/Resources/Publications/IAPRS2004 RFM2394.pdf, last date accessed Dec. 31, 2007.

Samadzadegan, F., A. Azizi, and A.Abootalebi. Automatic determination of the optimum generic sensor model based on genetic algorithm concepts, Photogrammetric Engineering & Remote Sensing, 2005. 71(3):277-288.

Tao C. Vincent and Yong Hu. "A comprehensive study of the rational function model for photogrammetric processing." Photogrammetric Engineering & Remote Sensing, (2001). pp. 1347-1357, vol. 67, No. 12.

* cited by examiner

METHOD FOR RPC REFINEMENT USING GROUND CONTROL INFORMATION

CROSS REFERENCE TO RELATED APPLICATIONS

This application claims the benefit and priority under 35 U.S.C. 119(e) to U.S. Provisional Patent Application No. 61/175,944 filed May 6, 2009.

FIELD

The present invention relates to sensor model refinement in general and Rational Polynomial Coefficient sensor model refinement in particular.

BACKGROUND

The term RPC typically refers to the Rational Polynomial Coefficient, or Rational Polynomial Camera coefficient [Chen et al., 2006]. It sometimes has been more generically defined as Rapid Positioning Capability [Dowman and Tao, 2002]. RPCs are sometimes also referred to as Rational Function Coefficients (RFCs), or Rational Functional Models (RFM) [Tao and flu, 2001]. RPCs are recommended by the OGC (Open GIS Consortium) and are widely used in the processing of high-resolution satellite images. An RPC model is a mathematical function that relates object space coordinates (latitude, longitude, and height) to image space coordinates (line and sample). It is expressed in the form of a ratio of two cubic functions of object space coordinates. Separate rational functions are used to express the object space to line, and the object space to sample, coordinate relationships [Dial and Grodecki, 2002a].

Because of ephemeris and attitude error, all satellite geometric sensor models, including physical and RPC models, have a definite value of absolute positioning error. For example, the ephemeris and attitude accuracy for IKONOS is about one meter for ephemeris and about one or two arc-seconds for attitude [Grodecki and Dial, 2003]. The accuracy for a single stereo pair of IKONOS images, without ground control, is 25.0 m (CE90), and 22.0 m (LE90) [Grodecki, 2001]. If the satellite positioning accuracy does not meet the needs of users, the sensor model should be refined by using Ground Control Points (GCPs) or other assistant data. Before the advent of IKONOS, users of satellite imagery typically made use of physical sensor models. Nowadays, instead of physical parameters, sometimes only a rational polynomial function which consists of 80 coefficients is available. This represents a completely new challenge, because the RPC has a high number of coefficients and there is no physical interpretation for the order and terms of these coefficients. Many researchers have attempted to address this challenge. Directly calculating a new RPC based on a large number of GCPs [Di et al., 2003] has been proven unfeasible [Grodecki and Dial., 2003; Hu et al., 2004]. The Batch Iterative Least-Squares (BILS) method and the Incremental Discrete Kalman Filtering (IDKF) method each requires a significant number of GCPs and also the covariance matrices of the RFCs, which are not available to most users [Hu and Tao, 2002]. The Pseudo GCP (PG) method, the Using Parameters Observation Equation (UPOE) method, and the Sequential Least Square Solution (SLSS) method [Bang et al., 2003] all face the problem of how to define the weightings of the coefficients for different observation equations.

In terms of accuracy and computational stability, the Bias Compensation method [Fraser and Hanley, 2003] so far appears to be the best method and has been widely used [Fraser and Hanley, 2003, 2005; Hu et al., 2004], but this method is effective only when the camera Field Of View (FOV) is narrow and the position and attitude errors are small [Grodecki and Dial, 2003]. Some satellites do meet these rigid conditions. For example as noted above, IKONOS imagery has an accuracy of about one meter for ephemeris and about one or two arc-seconds for attitude, and its FOV is less than one degree [Grodecki and Dial, 2003]. But many other satellites, including some of those launched from China and India, probably do not satisfy this condition. As a Generic Sensor Model (GSM), an RPC can accommodate an extremely wide range of images without a need for the satellite ephemeris [Samadzadegan et al., 2005]. Therefore, an RPC can be used in a number of different sensors, such as linear push-broom scanners, RADAR, airborne and space borne sensors. In these cases, the issue becomes one of how to effectively refine RPC using as few GCPs as possible.

On Sep. 24, 1999, IKONOS was launched. Since then, the mapping community has begun to recognize the importance of RPC; a mathematical function which relates the object space and image space (Equations 1 to 2).

$$x = \frac{P_1(X, Y, Z)}{P_2(X, Y, Z)} \quad \text{(Eq. 1)}$$

$$y = \frac{P_3(X, Y, Z)}{P_4(X, Y, Z)} \quad \text{(Eq. 2)}$$

$$P(X, Y, Z) = \sum_{i=0}^{m1} \sum_{j=0}^{m2} \sum_{k=0}^{m3} a_{ijk} X^i Y^j Z^k \quad \text{(Eq. 3)}$$

$$0 \le m_1 \le 3; \quad \text{(Eq. 4)}$$
$$0 \le m_2 \le 3;$$
$$0 \le m_3 \le 3;$$
$$m_1 + m_2 + m_3 \le 3$$

Here (x, y) are the image coordinates, (X, Y, Z) are the ground coordinates, and $a_{ijk}$ is the polynomial coefficient. One of the coefficients in the denominator is a constant 1. In some cases (e.g., IKONOS), the two denominators P2 and P4 have the same coefficients.

The RPC may be refined directly or indirectly. Direct refining methods modify the original RPCs themselves, while indirect refining methods introduce complementary or concatenated transformations in image or object space, and do not change the original RPCs directly [Hu et al., 2004].

SUMMARY

In one aspect, the present invention relates to a computer implemented method of adjusting original rational polynomial coefficients of an RPC model for an image acquired by an image sensor comprising providing rational polynomial coefficients associated with the image calculating a pseudo position and attitude angles for the sensor using the original coefficients, providing at least one ground control point associated with the image adjusting the pseudo position and attitude angles using the at least one ground control point, and adjusting the original coefficients for the image using the adjusted pseudo position and attitude angles.

As an option, the method may comprise the further steps of wherein the step of calculating the pseudo position and attitude angles comprises calculating a pseudo sensor position and attitude angles for each ground control point. As a further feature, the step of generating an RPC model for the image can comprise generating cubic points using the adjusted pseudo position and attitude angles.

As a further option, the method can further comprise calculating a pseudo light ray for the sensor using the coefficients where the pseudo light ray approximates a light ray existing when the image was acquired by the sensor, and deriving the pseudo position and attitude for the sensor using the pseudo light ray where the pseudo position and attitude angles approximate the position of the sensor when the image was acquired.

As a still further option, the method can further comprise selecting an image point on the image; assigning a first elevation value to the image point; calculating a ground position for a first ground point corresponding to the image point using the first elevation value; assigning a second elevation value to the image point where the second elevation value is greater than the first elevation value; calculating a ground position for a second ground point corresponding to the image point using the second elevation value; assigning a sensor height value; calculating a first vector from the first ground point to the second ground point using the sensor height value where the vector represents the pseudo light ray and calculating the pseudo sensor position using the first vector; and calculating a second vector from the first vector and calculating a rotation angle in the x-direction and a rotation angle in the y-direction using the first vector and assigning a value of approximately zero to a rotation angle in the z-direction where the rotation angles represent the pseudo angles of the sensor.

As yet another option, adjusting the pseudo position and attitude angles comprises calculating a linear polynomial equation.

As yet a further option, the method adjusting the original coefficients comprises iteratively calculating the ground positions for the first and second ground points.

In another aspect, the adjusted original coefficients can be used for geometric correction of the image.

In another aspect, the invention relates to a computer implemented method of adjusting coefficients of an RPC sensor model defining a position and attitude for a sensor comprising providing an image point from the image acquired by the sensor, calculating two corresponding ground points for the image point at two different elevations, calculating a first vector between the ground points; calculating a position of the sensor comprising extending the first vector to a height of the sensor; calculating a second vector using the first vector; calculating two rotation angles using the second vector, and adjusting the coefficients using the pseudo position and the rotation angles.

In a still further aspect, the invention relates to a computer implemented method of adjusting RPC values for an image sensor comprising calculating a position and an attitude in object space for the sensor from the RPC values; providing a ground control point from an image acquired by the sensor; calculating a pseudo sensor position and attitude in object space corresponding to the ground control point; adjusting the sensor's position and attitude using the pseudo position and attitude; and adjusting the RPC values using the adjusted sensor position and attitude.

In yet a further aspect, the invention relates to a computer software product for use on a computer system, the computer software product comprising a computer readable storage medium, computer program code means stored on the computer readable storage medium, the computer program code means comprising encoded instructions that, when executed by the computer system, cause the computer system to execute steps of the method of one or more of the aspects set out above.

DESCRIPTION OF THE INVENTION

Figure 1:
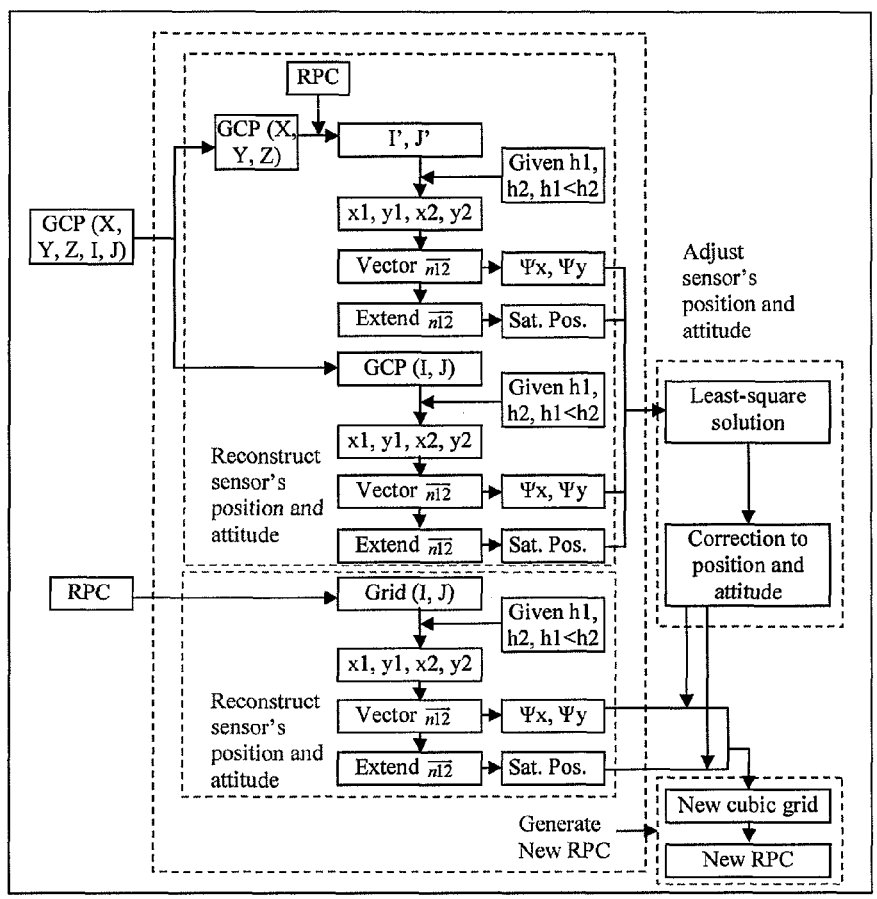
FIG. 1 Flowchart of RPC refinement according to a method of the present invention.

Referring to FIG. 1, the generic method according to the invention includes the following three steps. (1) Reconstruct the sensor's position and attitude. This step involves restoring the pseudo light ray that existed when the image was acquired. The sensor's pseudo position and attitude (equivalent to camera Exterior Parameters (EPs)) are obtained; (2) Adjust the sensor's position and attitude. The GCPs are used to refine the EPs; and (3) Generate a new RPC. The new RPC is generated using a grid of image points.

Reconstructing the Sensor's Position and Attitude

Figure 2:
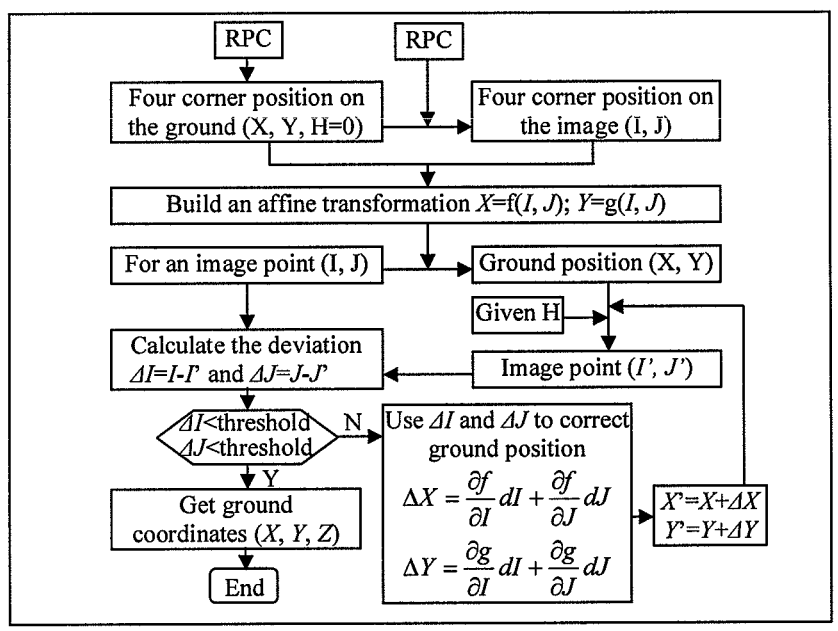
FIG. 2 Flow chart of ground position (X, Y, H) calculation from image position (I,J) based on RPC according to the invention.
Figure 3:
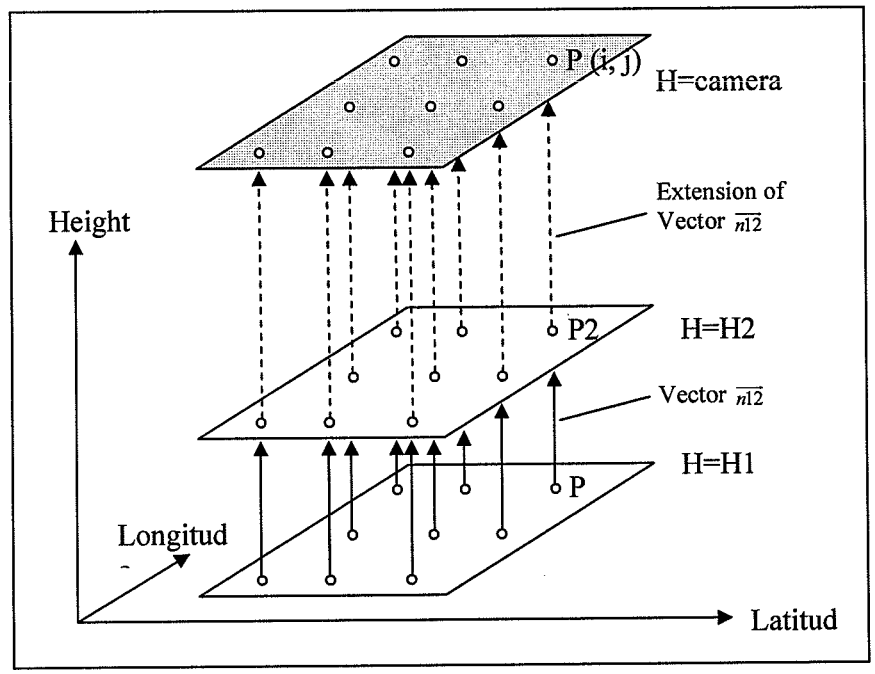
FIG. 3 Restoration of sensor's attitude and light ray according to the invention.

Step 1. From a point on the image P(I, J), given an elevation value (h1), the corresponding ground position P1(x1, y1) of the point P(I, J) is obtained by an iterative process (see FIG. 2). For the same image point P(I, J), given another elevation value (h2), h2>h1, another ground point P2(x2, y2) is obtained. Then for the point P(I, J) on the image, two corresponding ground points P1(x1, y1, h1) and P2(x2, y2, h2) are obtained. A vector $\overrightarrow{n12}$ from point P1(x1, y1, h1) to point P2(x2, y2, h2) is calculated (see FIG. 3) as follows:

$$\overrightarrow{n12}=(x2-x1, y2-y1, h1-h2) \quad \text{(Eq. 5)}$$

If this vector were the light ray of the sensor in acquiring the image point P(I, J), the sensor position Ps1(Xs1, Ys1, Hs1) can be obtained from the extension of this vector. The sensor height Hs is a fixed value. For a satellite, Hs will be large, e.g., 600 km. If the height is low, a small discrepancy with the x and y ($\epsilon_x$, $\epsilon_y$) will lead to a large correction to the two rotation angles $\psi_x$ and $\psi_y$. For an airborne remote sensing system, this height may be several thousand meters.

Of course, this vector is not the actual light ray by which the image point P(I, J) was acquired. Instead it is a pseudo light ray and sensor position Ps1(Xs1, Ys1, Hs1) is a pseudo sensor position. Fortunately, it does not matter whether the light ray is the actual one or not. Even a pseudo light ray and pseudo sensor position are effective for the RPC refinement in the Generic method according to the invention.

From vector $\overrightarrow{n12}$, vector $\overrightarrow{n21}$ can be obtained as follows:

$$\overrightarrow{n21}=(x1-x2, y1-y2, h1-h2) \quad \text{(Eq. 6)}$$

Figure 4:
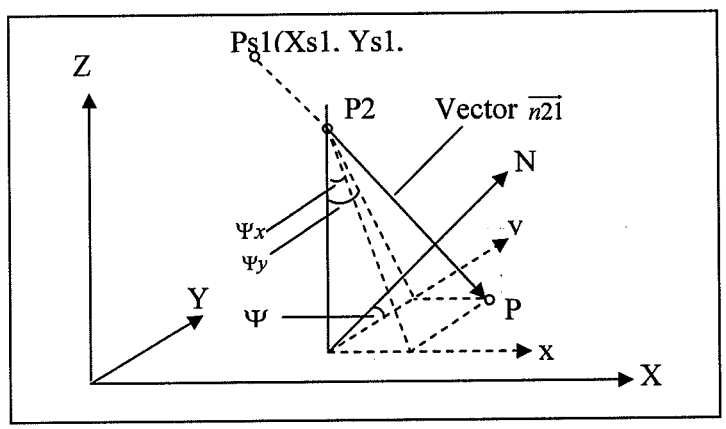
FIG. 4 Restoration of sensor's position and attitude according to the invention.

From vector $\overrightarrow{n21}$, two tilted angles in x and y directions $\Psi x$ and $\Psi y$ can be obtained (see FIG. 4). For high-resolution satellite images, the azimuth accuracy is very high, so the rotation angle $\Psi z$ is very small. Therefore its initial value can be set to '0'. For airborne sensors, the azimuth angle should be estimated according to GCPs and other supplemental information using methods that would be known to those skilled in the art.

Up to now, for an image point P(I, J), the preceding method steps have provided corresponding pseudo sensor position Ps1(Xs1, Ys1, Hs1) and three rotation angles around the x, y, and z axis $\Psi y$, $\Psi x$ and $\Psi z$.

Adjusting the Sensor's Position and Attitude

Step 2. For every GCP, its corresponding pseudo sensor position (Xs, Ys, Hs) and three rotation angles $\Psi y$, $\Psi x$ and $\Psi z$ are calculated.

Step 3. The RPC adjustment observation equations for each GCP are constructed as follows.

$$(\hat{X}s+(\hat{H}s-h_i)*\tan(\hat{\psi}_x))*\cos(\hat{\psi}_z)+(\hat{Y}s+(\hat{H}s-h_i)*\tan(\hat{\psi}_y)) \\ *\sin(\hat{\psi}_z)-x_i+\epsilon x_i=0 \quad \text{(Eq. 7)}$$

$$-(\hat{X}s+(\hat{H}s-h_i)*\tan(\hat{\psi}_x))*\sin(\hat{\psi}_z)+(\hat{Y}s+(\hat{H}s-h_i)*\tan(\hat{\psi}_y)) \\ *\cos(\hat{\psi}_z)-y_i+\epsilon y_i=0 \quad \text{(Eq. 8)}$$

$$\hat{X}s=Xs+\Delta Xs \quad \text{(Eq. 9)}$$

$$\hat{Y}s=Ys+\Delta Ys \quad \text{(Eq. 10)}$$

$$\hat{H}s=Hs+\Delta Hs \quad \text{(Eq. 11)}$$

$$\hat{\psi}_x=\psi_x+\Delta\psi_x \quad \text{(Eq. 12)}$$

$$\hat{\psi}_y=\psi_y+\Delta\psi_y \quad \text{(Eq. 13)}$$

$$\hat{\psi}_z=\psi_z+\Delta\psi_z \quad \text{(Eq. 14)}$$

Xs, Ys, Hs are pseudo sensor position;
$x_i$, $y_i$, $h_i$ are ground coordinates of $i^{th}$ GCP; and
$\psi_x$, $\psi_y$, and $\psi_z$ are rotation angles of the vector corresponding to the $i^{th}$ GCP.

In these observation equations, the satellite position (Xs, Ys, Hs) and three rotation angles ($\psi_x$, $\psi_y$, $\psi_z$) are adjustable parameters.

Because the sensor's position and attitude changes with time in a pushbroom remote sensing system, a polynomial model defined in the domain of image coordinates is used to represent the adjustable function $\Delta Xs$, $\Delta Ys$, $\Delta Hs$, $\Delta\psi_x$, $\Delta\psi_y$, and $\Delta\psi_z$. Although a higher order polynomial may achieve higher internal accuracy, this higher internal accuracy normally may not lead to a more accurate RPC, because the RPC is a mathematical function that is only an approximation of a rigorous physical model. Experiments by the inventors have shown that the higher the order of the polynomial model, the greater the amount of the accuracy that will be lost after the approximation of the new RPC generation. Therefore, a linear polynomial model is used for RPC refinement:

$$\Delta Xs=a_0+a_S*\text{Sample}+a_L*\text{Line} \quad \text{(Eq. 15)}$$

$$\Delta Ys=b_0+b_S*\text{Sample}+b_L*\text{Line} \quad \text{(Eq. 16)}$$

$$\Delta Hs=c_0+c_S*\text{Sample}+c_L*\text{Line} \quad \text{(Eq. 17)}$$

$$\Delta\psi_x=d_0+d_S*\text{Sample}+d_L*\text{Line} \quad \text{(Eq. 18)}$$

$$\Delta\psi_y=e_0+e_S*\text{Sample}+e_L*\text{Line} \quad \text{(Eq. 19)}$$

$$\Delta\psi_z=f_0+f_S*\text{Sample}+f_L*\text{Line} \quad \text{(Eq. 20)}$$

For high-resolution images obtained from satellites such as IKONOS and QuickBird, the errors in satellite height and yaw angle are very small [Grodecki and Dial, 2003]. Therefore, $\Delta Xs$, $\Delta Ys$, $\Delta\psi_x$, and $\Delta\psi_y$ can provide enough information to accurately correct the satellite's position and attitude. When fewer than 3 GCPs are used for RPC refinement, only the translations $a_0$, $b_0$, $d_0$, $e_0$ are considered. When 3 to 9 GCPs are used, $a_i$, $b_i$, $d_i$, and $e_i$, are considered. According to the inventors' experiments, for IKONOS and QuickBird, all 12 parameters are considered only when: a) the number of GCPs is large enough (50 or more); b) the GCPs are distributed uniformly; and c) the GCP's accuracy is good enough (at least sub-pixel). Otherwise, too many parameters may be generated with a resultant loss of accuracy. These parameters are solved in the following order: ($d_i$, $e_i$, $f_i$) for $\Delta\psi_x$, $\Delta\psi_y$ and $\Delta\psi_z$; ($a_i$, $b_i$, $c_i$) for $\Delta Xs$, $\Delta Ys$ and $\Delta Hs$.

Generating a New RPC

Step 4. In order to generate a new RPC, a grid of image points is used to calculate corresponding pseudo sensor positions and attitude angles. These are adjusted according to equations (18) through (20).

Step 5. After the sensor positions and attitude angles corresponding to a grid of image points have been adjusted with equations (18~20), a set of cubic points is generated with these new vectors. The new RPC is generated using these cubic points.

EXPERIMENTS

In order to evaluate a Generic method according to embodiments of the invention, two sets of experiments were carried out. First, SPOT5 and IKONOS image data was used to test the Generic method and compare the results with that of the Bias Compensation method under the condition of narrow field view and small ephemeris and attitude errors. Another set of experiments using simulated SPOT5 data generated by adding errors to the ephemeris and the attitude data were carried out. The resulting simulated data was used to compare the Generic method and the Bias Compensation method, and to determine the Generic method's capability under a variety of different conditions.

Experiment Set 1

Figure 5:
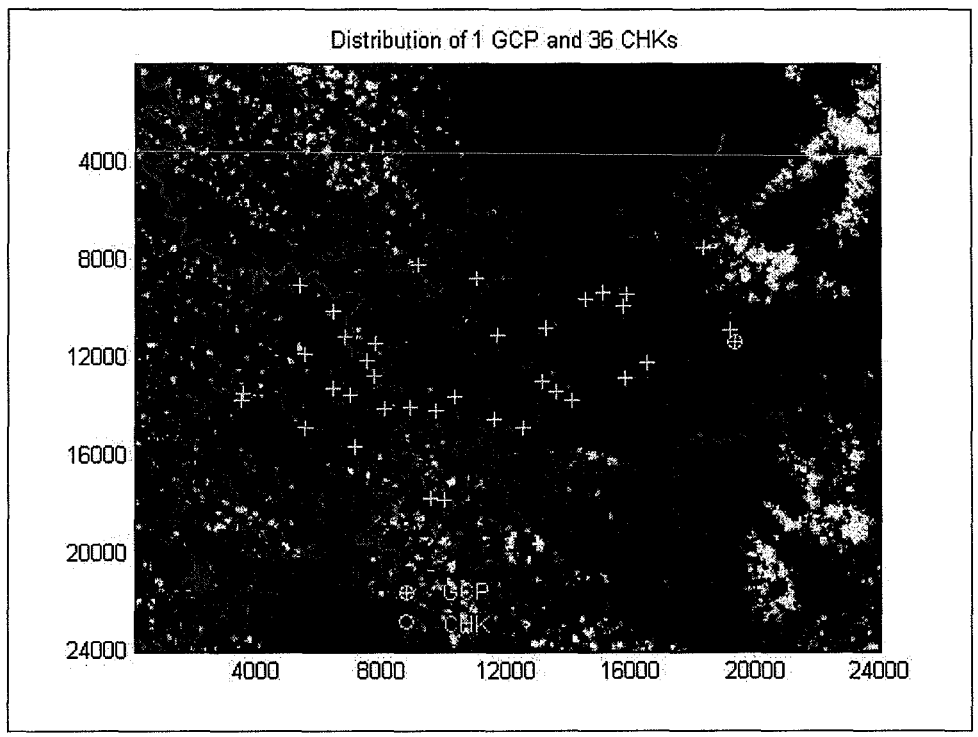
FIG. 5 Distribution of 1 GCP and 36 CHK points on SPOT5 image.
Figure 6:
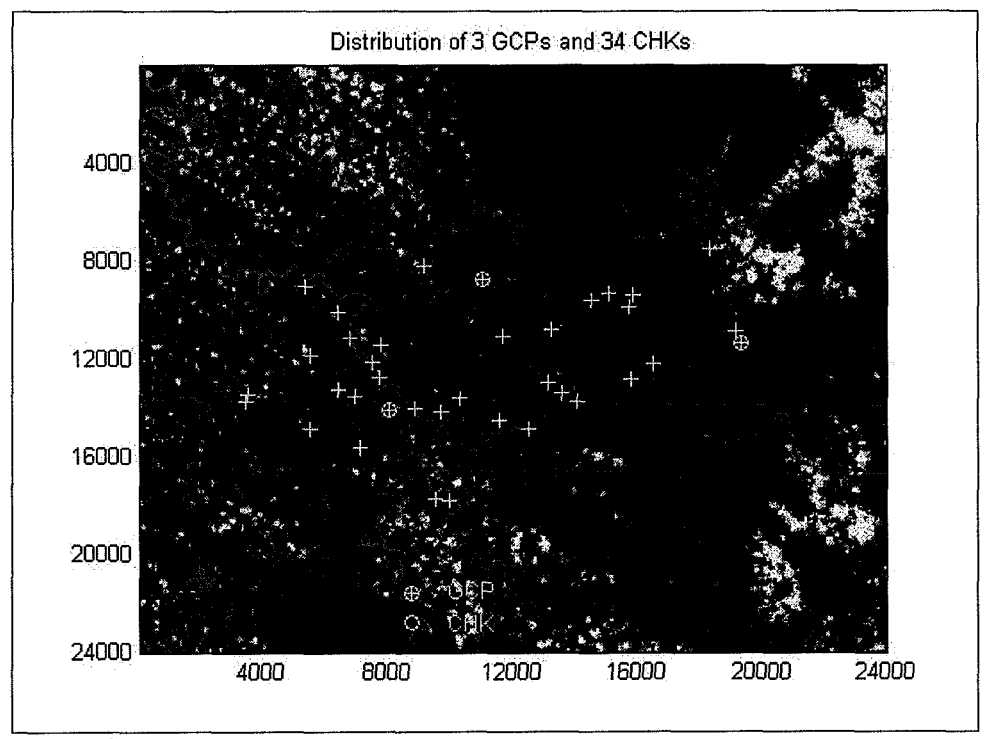
FIG. 6 Distribution of 3 GCPs and 34 CHK points on SPOT5 image.
Figure 7:
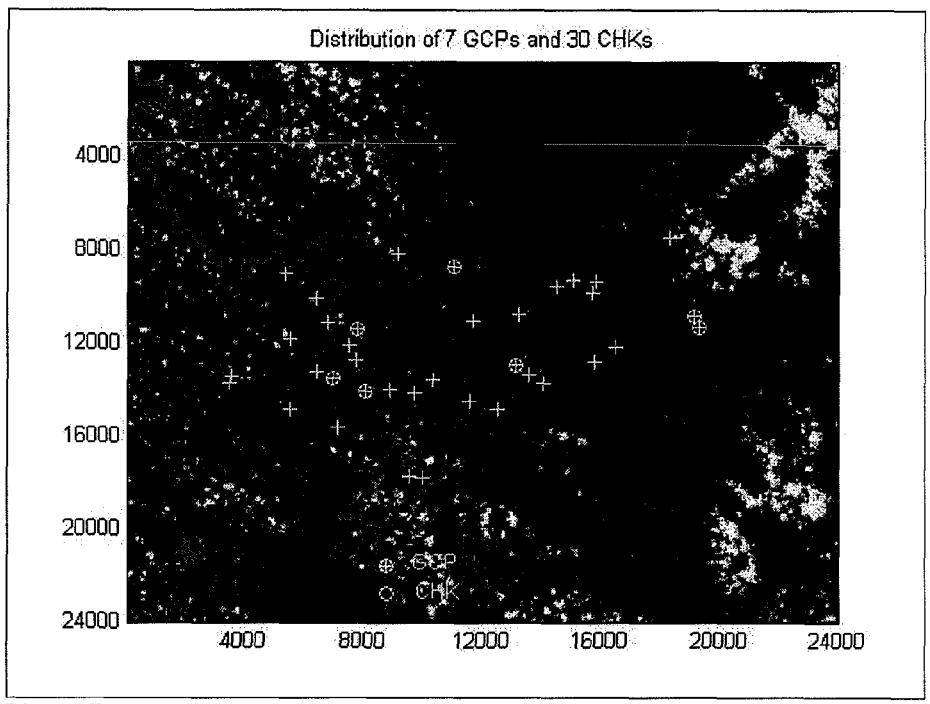
FIG. 7 Distribution of 7 GCP and 30 CHK points on SPOT5 image.

In this set of experiments, SPOT5 and IKONOS image data were used to test the capability of the Generic method under the condition of narrow field of view and small position and attitude errors.
(1) SPOT5 Data In the SPOT5 image, there are total of 37 GCPs. We used 1, 3, and 7 GCPs to refine the RPC respectively. The other 36, 34, and 30 ground control points were used as check points. FIGS. 5, 6, and 7 show the distributions of GCPs and check points on the SPOT5 image in 3 of the test cases.

Figure 8:
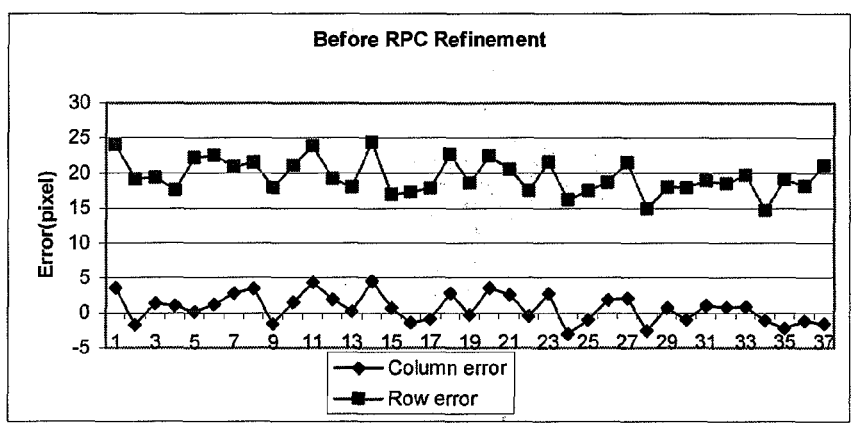
FIG. 8 Image Coordinate Residuals of 37 control points before RPC refinement.
Figure 9:
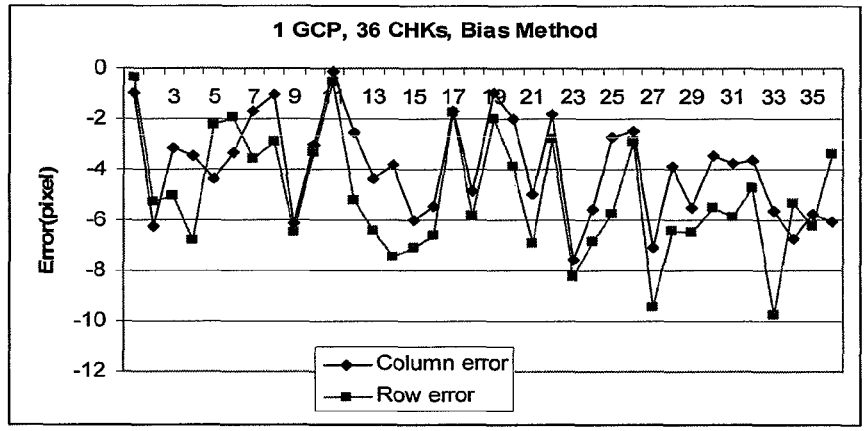
FIG. 9 Image Coordinate Residuals of 36 CHK points after RPC refinement with 1 GCP by the Bias method.
Figure 10:
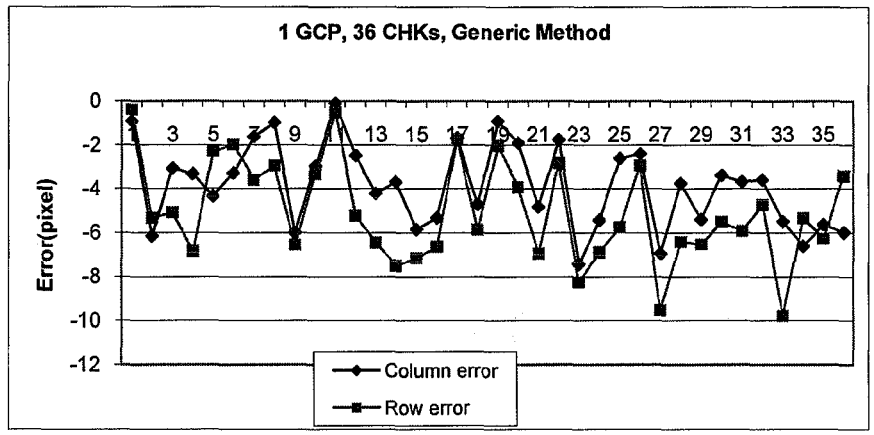
FIG. 10 Image Coordinate Residuals of 36 CHK points after RPC refinement with 1 GCP by the Generic method.
Figure 11:
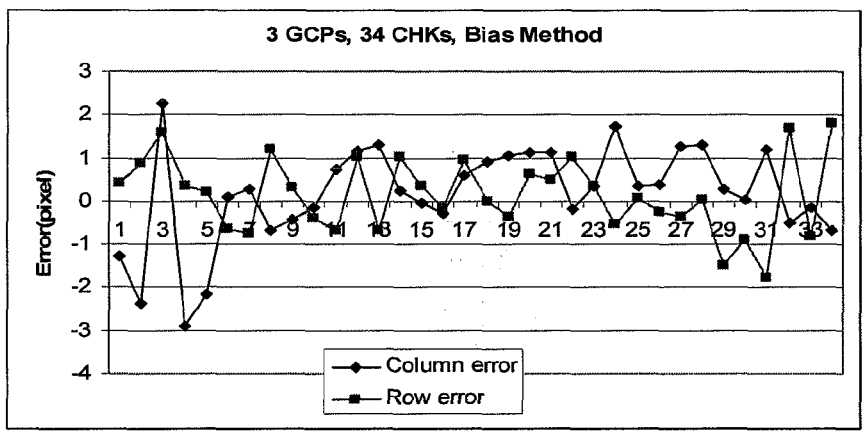
FIG. 11 Image Coordinate Residuals of 34 CHK points after RPC refinement with 3 GCPs by the Bias method.
Figure 12:
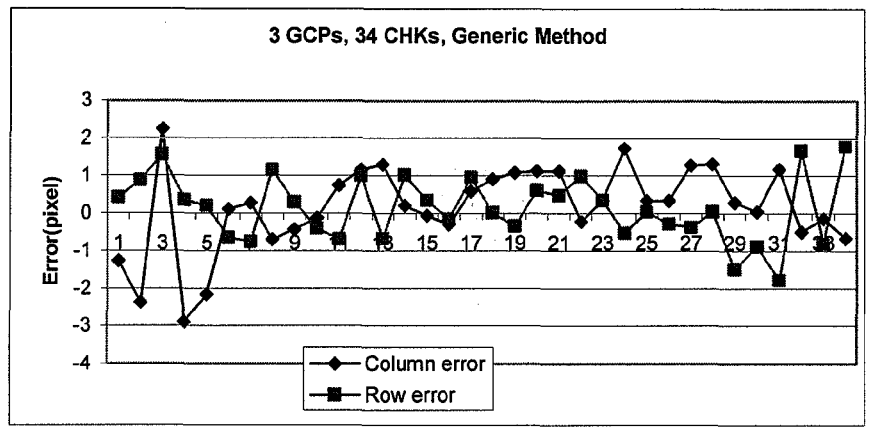
FIG. 12 Image Coordinate Residuals of 34 CHK points after RPC refinement with 3 GCPs by the Generic method.
Figure 13:
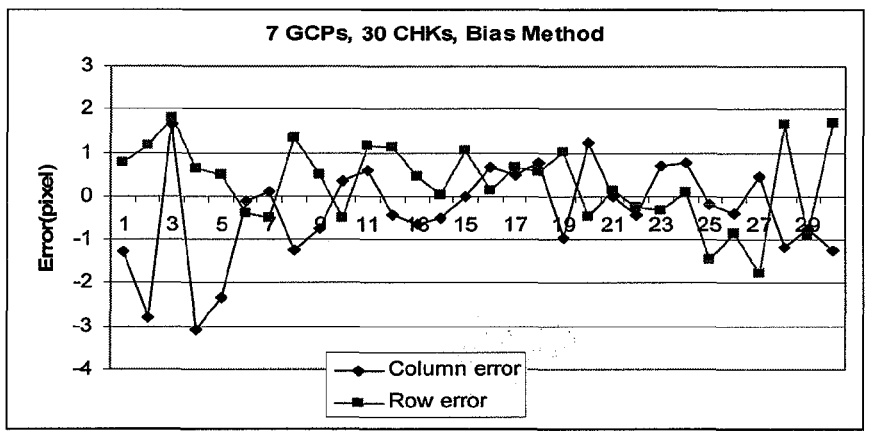
FIG. 13 Image Coordinate Residuals of 30 CHK points after RPC refinement with 7 GCPs by the Bias method.
Figure 14:
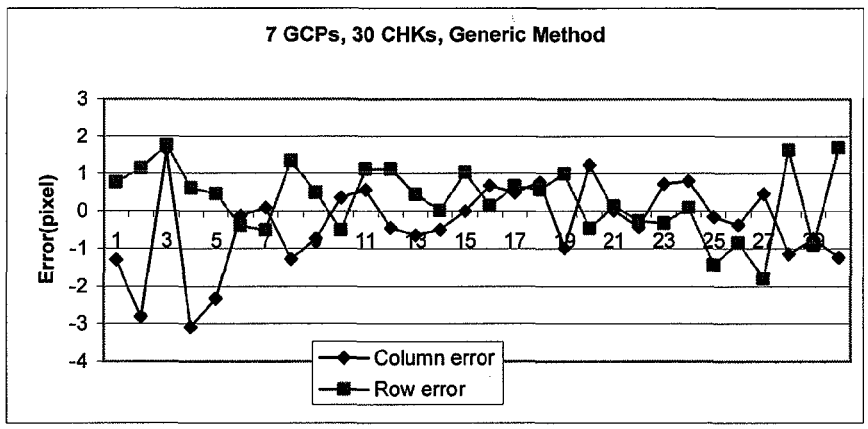
FIG. 14 Image Coordinate Residuals of 30 CHK points after RPC refinement with 7 GCP by the Generic method.

FIG. 8 shows the image coordinate residue of 37 control points before RPC refinement.

FIGS. 9 to 14 show the image coordinate residue of CHK points after RPC refinement with 1, 3, 7 GCPs by the Bias method and the Generic method respectively.

Figure 15:
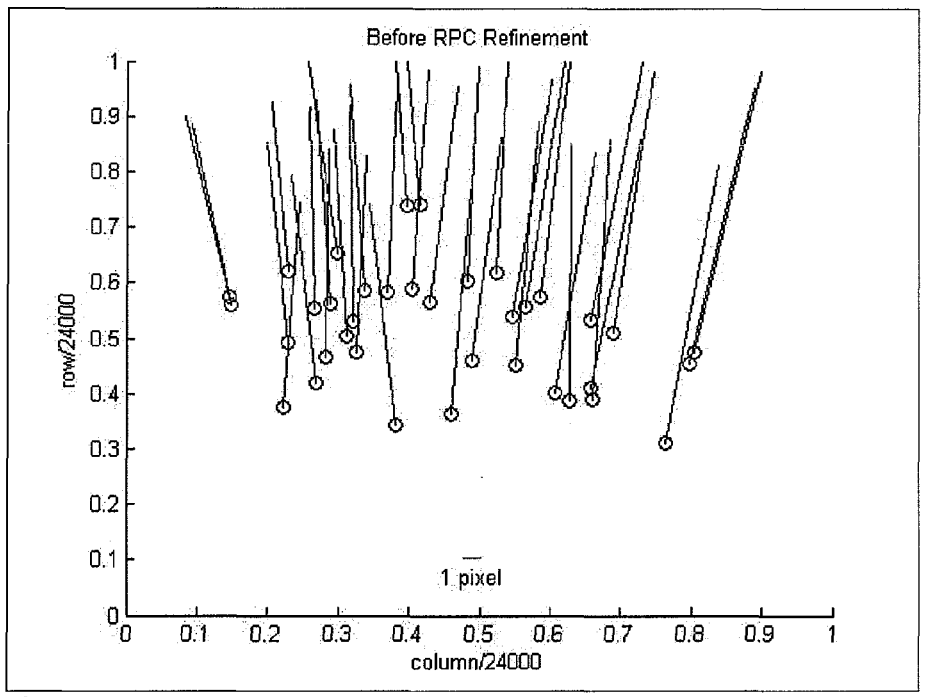
FIG. 15 Horizontal errors of 37 GCPs before RPC refinement.
Figure 16:
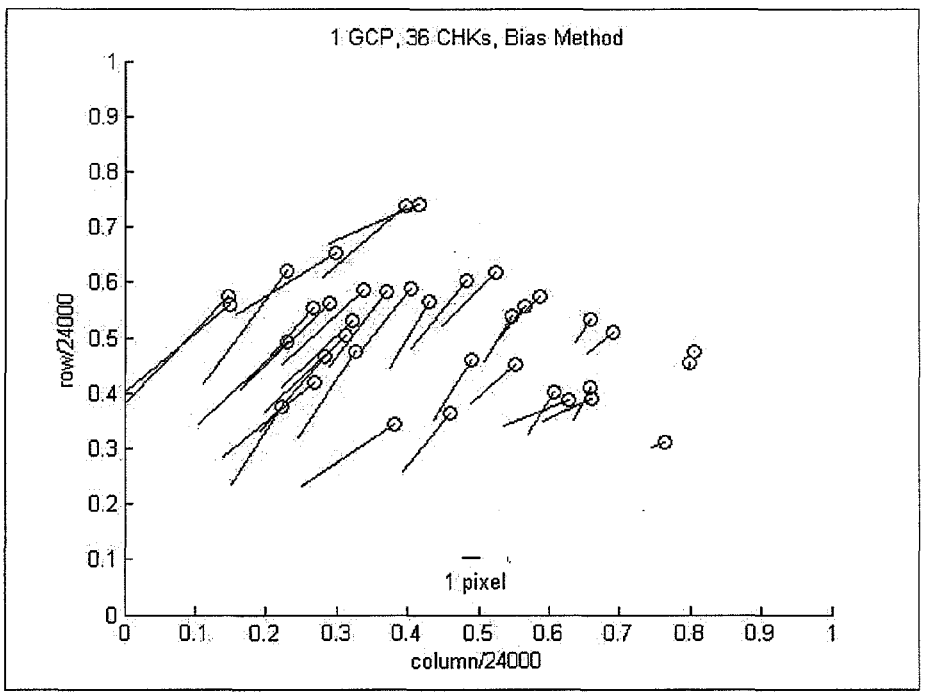
FIG. 16 Horizontal errors of 36 CHKs after RPC refinement with 1 GCP by the Bias method.
Figure 17:
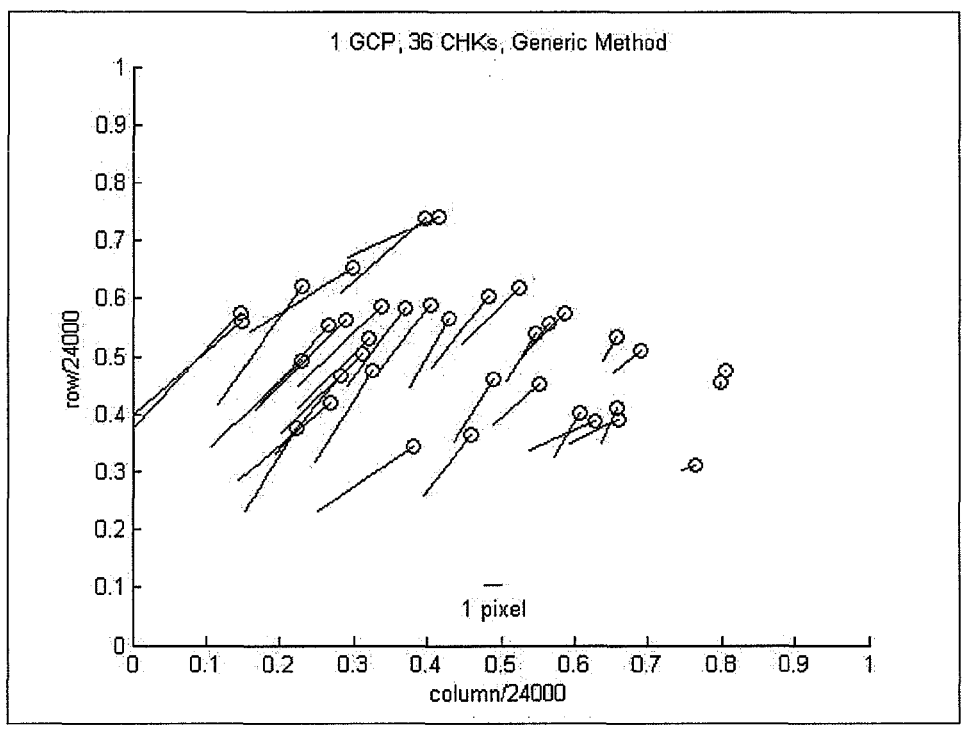
FIG. 17 Horizontal errors of 36 CHKs after RPC refinement with 1 GCP by the Generic method.
Figure 18:
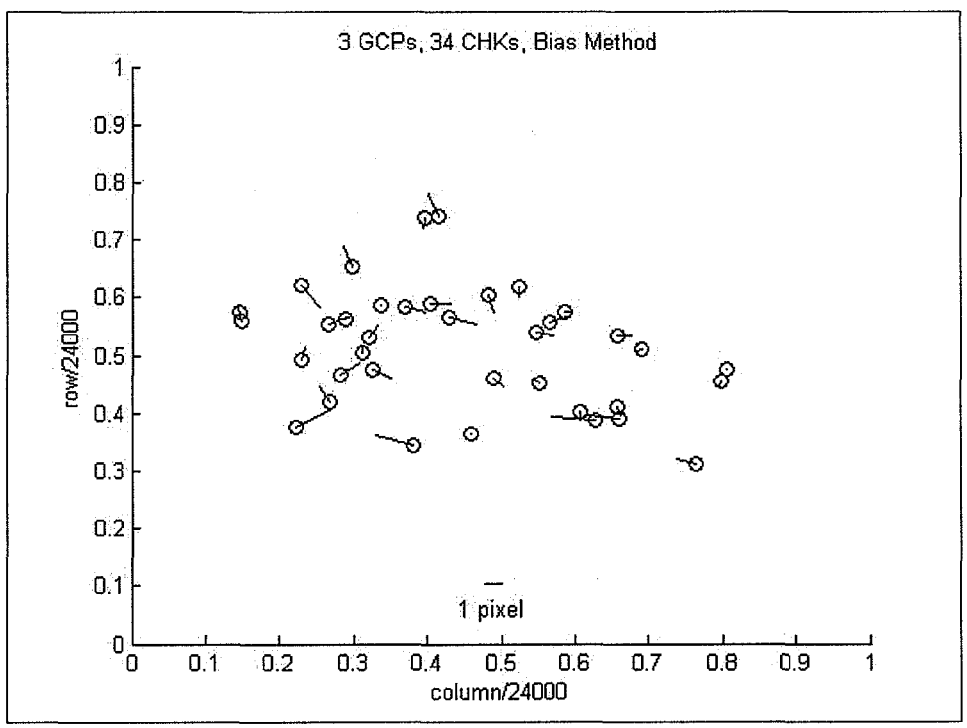
FIG. 18 Horizontal errors of 34 CHKs after RPC refinement with 3 GCPs by the Bias method.
Figure 19:
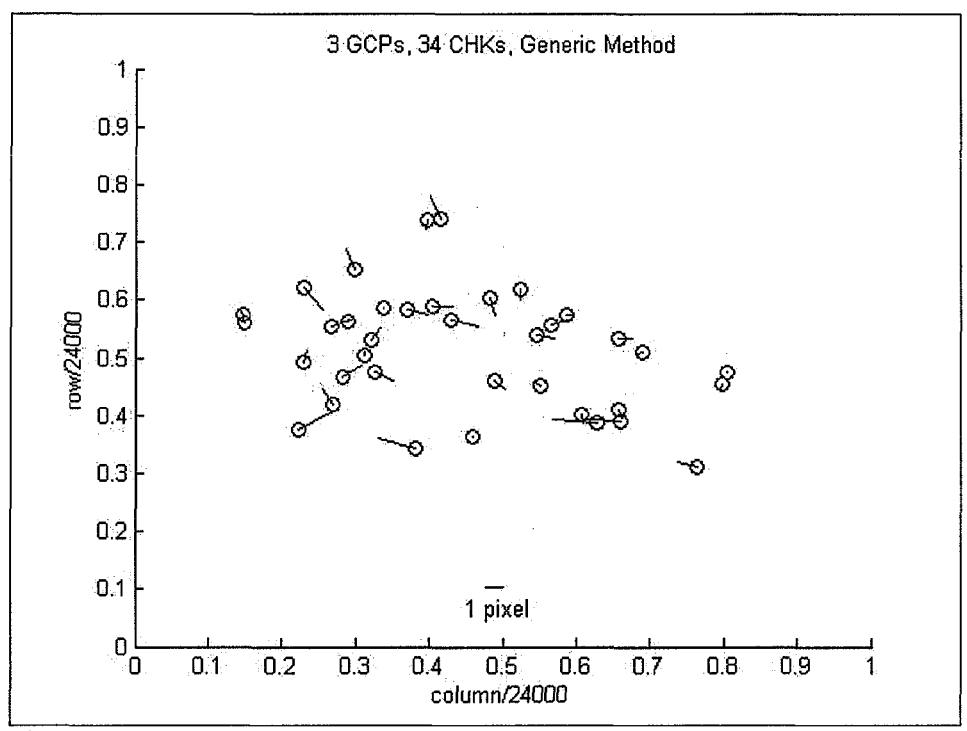
FIG. 19 Horizontal errors of 34 CHKs after RPC refinement with 3 GCPs by the Generic method.
Figure 20:
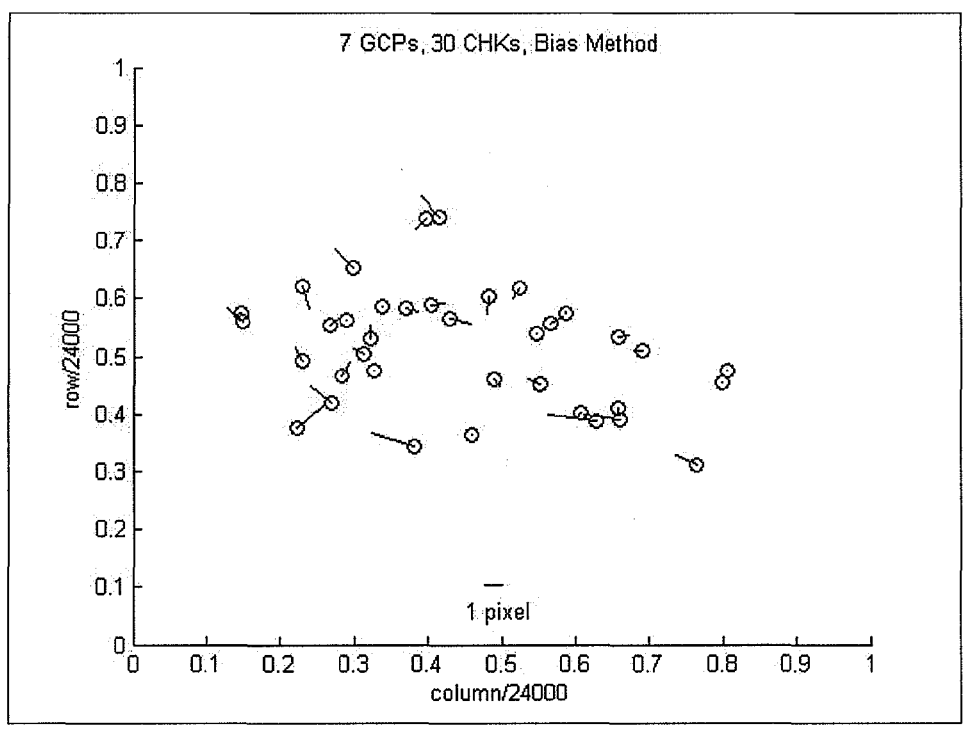
FIG. 20 Horizontal errors of 30 CHKs after RPC refinement with 7 GCPs by the Bias method.
Figure 21:
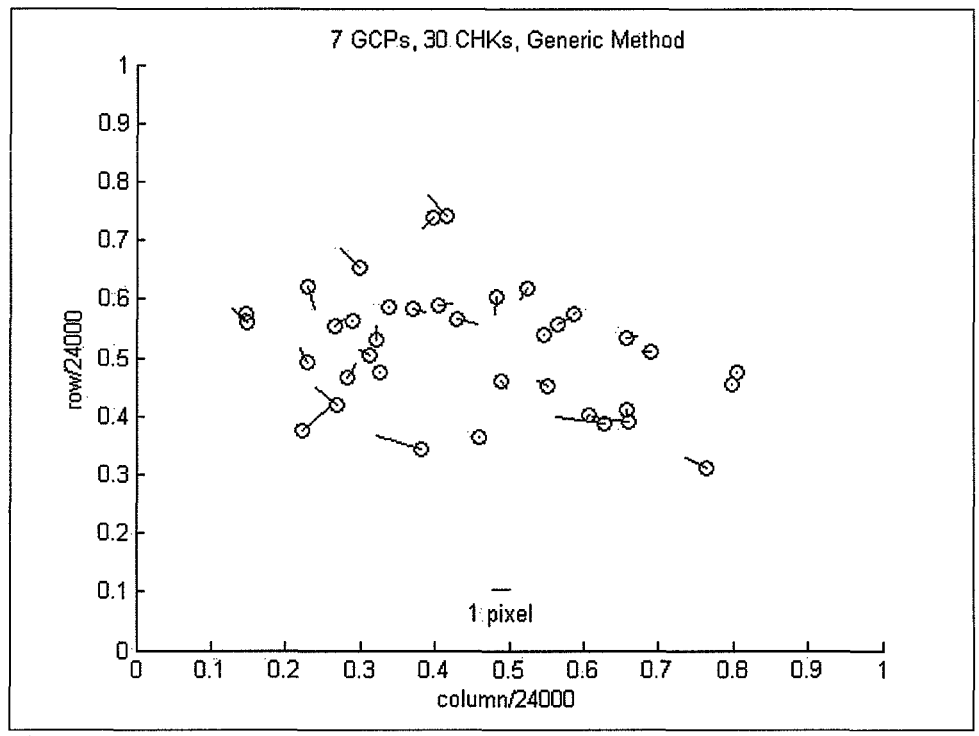
FIG. 21 Horizontal errors of 30 CHKs after RPC refinement with 7 GCPs by the Generic method.

FIG. 15 plots the positions of the 37 GCPs within the image and shows their respective horizontal errors before RPC refinement.

FIGS. 16 to 21 are also plots of the 37 GCPs within the image and illustrate the horizontal errors of 36, 34, 30 CHK points after RPC refinement with 1, 3, 7 GCPs by the Bias method and the Generic method respectively.

Figure 22:
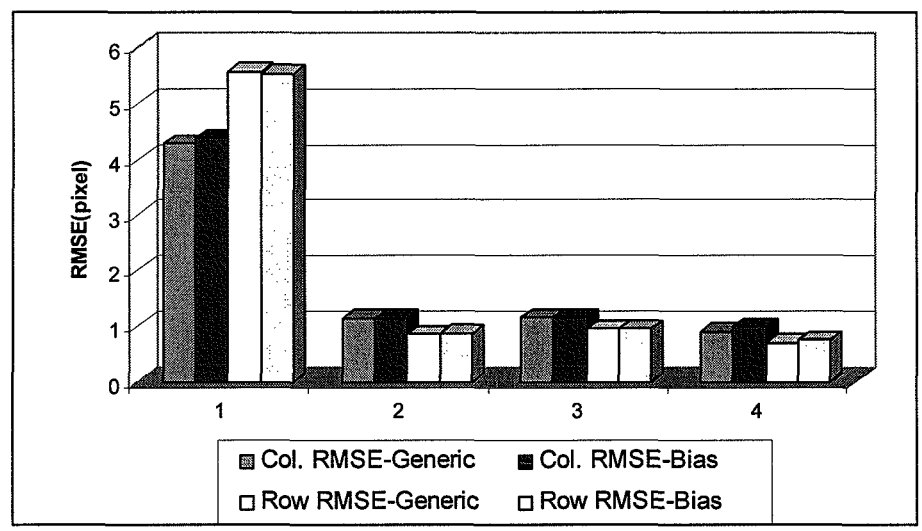
FIG. 22 Accuracy comparison between the Bias method and Generic method by using SPOT5 image data in case 1, 2, 3 and 4

Table 1 lists the accuracy comparison between the Bias method and Generic method using SPOT5 image data in 5 cases. FIG. 22 shows the accuracy comparison between the Bias method and Generic method using SPOT5 image data in case 1, 2, 3, and 4.

TABLE 1

Accuracy comparison between the Bias method and Generic method by using SPOT5 image data in 5 cases

| | | Generic method | | Bias method | |
|---|---|---|---|---|---|
| Case | No. of GCPs (No. of CHKs) | Col. RMSE (pixel) | Row RMSE (pixel) | Col. RMSE (pixel) | Row RMSE (pixel) |
| 0 | 0 (37) | 2.12 | 19.65 | 2.12 | 19.65 |
| 1 | 1 (36) | 4.28 | 5.57 | 4.38 | 5.54 |
| 2 | 3 (34) | 1.13 | 0.86 | 1.13 | 0.87 |
| 3 | 7 (30) | 1.15 | 0.95 | 1.15 | 0.95 |
| 4 | 37 (0) | 0.91 | 0.70 | 0.99 | 0.76 |

Note:
Col.—Column;
RMSE—Root Mean Square Error

Table 1 and FIG. 22 illustrate that the accuracy of the Generic method and the Bias Compensation method are quite similar when the field of view is narrow and the ephemeris and attitude errors are small. The largest difference between the accuracy of the Generic method and the accuracy of the Bias Compensation method is less than 0.1 pixels.
(2) IKONOS Data An IKONOS image was also tested. There were a total of 113 GCPs in this test field. Initially, only 1 GCP was used to refine the RPC. The other 112 ground control points were used as check points. In the second test, 9 GCPs were used to refine RPC, and the other 104 ground control points were used as check points.

Figure 23:
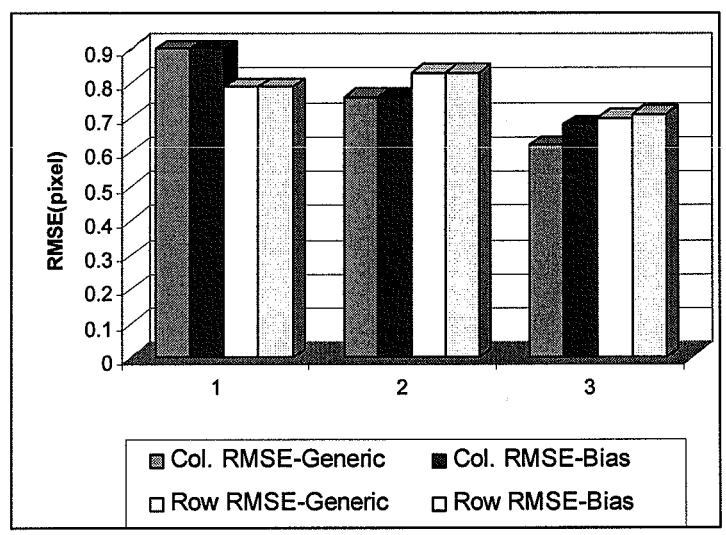
FIG. 23 Accuracy comparison between the Bias method and Generic method by using IKONOS image data in 3 cases.

Table 2 lists the accuracy comparison between the Bias method and the Generic method by using IKONOS image data in 3 cases. FIG. 23 shows the accuracy comparison between the Bias method and Generic method by using IKONOS image data in 3 cases.

TABLE 2

Accuracy comparison between the Bias method and the Generic method by using IKONOS image data in 4 cases

| | | Generic method | | Bias method | |
|---|---|---|---|---|---|
| Case | No. of GCPs (No. of CHKs) | Col. RMSE (pixel) | Row RMSE (pixel) | Col. RMSE (pixel) | Row RMSE (pixel) |
| 0 | 0 (113) | 5.09 | 3.41 | 5.09 | 3.41 |
| 1 | 1 (112) | 0.90 | 0.79 | 0.90 | 0.79 |
| 2 | 9 (104) | 0.76 | 0.83 | 0.76 | 0.83 |
| 3 | 114 (0) | 0.62 | 0.70 | 0.68 | 0.71 |

Note:
Col.—column;
RMSE—Root Mean Square Error

Table 2 and FIG. 23 show that the accuracy of the Generic method and the accuracy of the Bias Compensation method are again similar. Once again, the largest difference in accuracy between the two methods is less than 0.1 pixels.

This experiment set showed that the Generic method has the same capability as the Bias Compensation method to process images having a narrow field of view and small position and attitude errors.

Experiment Set 2

In this set of experiments, SPOT5 image data was used to produce simulated data in 9 cases (Table 3) to test the capability of processing images under a variety of different ephemeris and attitude errors.

TABLE 3

4 cases of simulated SPOT5 data by adding different error to satellite position and attitude data

| Case | Δx (m) | Δy (m) | Δz (m) | ΔΨx (rad) | ΔΨy (rad) | ΔΨz (rad) |
|---|---|---|---|---|---|---|
| 1 | 1000 | 1000 | 1000 | 0.1 | 0.1 | 0.1 |
| 2 | 100 | 100 | 100 | 0.01 | 0.01 | 0.01 |
| 3 | 10 | 10 | 10 | 0.001 | 0.001 | 0.001 |
| 4 | 1000 | 1000 | 1000 | 0 | 0 | 0 |
| 5 | 100 | 100 | 100 | 0 | 0 | 0 |
| 6 | 10 | 10 | 10 | 0 | 0 | 0 |
| 7 | 0 | 0 | 0 | 0.1 | 0.1 | 0.1 |
| 8 | 0 | 0 | 0 | 0.01 | 0.01 | 0.01 |
| 9 | 0 | 0 | 0 | 0.001 | 0.001 | 0.001 |

Table 4 lists the accuracy comparison between the Bias method and Generic method by using 1 GCP and 36 CHK points in 9 cases. Table 5 lists the accuracy comparison between the Bias method and Generic method by using 3 GCP and 34 CHK points in 9 cases. Table 6 lists the accuracy comparison between the Bias method and Generic method by using 7 GCP and 30 CHK points in 9 cases.

TABLE 4

Accuracy comparison between the Bias method and Generic method by using 1 GCP and 36 CHK points in 9 cases.

| | 1 GCP, 36 CHKs | | | |
|---|---|---|---|---|
| | Bias method | | Generic method | |
| No. of case | Column Std. Dev. (pixel) | Row Std. Dev. (pixel) | Column Std. Dev. (pixel) | Row Std. Dev. (pixel) |
| 1 | 1040.90 | 166.77 | 959.91 | 17.22 |
| 2 | 109.06 | 7.59 | 98.33 | 5.45 |
| 3 | 15.86 | 4.58 | 14.79 | 3.32 |
| 4 | 5.40 | 7.36 | 3.41 | 5.94 |
| 5 | 5.52 | 4.68 | 5.34 | 4.45 |
| 6 | 5.53 | 4.42 | 5.54 | 4.30 |
| 7 | 1040.75 | 160.96 | 961.33 | 19.70 |
| 8 | 109.07 | 7.27 | 98.55 | 5.62 |
| 9 | 15.86 | 4.55 | 14.81 | 3.31 |

TABLE 5

Accuracy comparison between the Bias method and Generic method by using 3 GCP and 34 CHK points in 9 cases.

| | 3 GCP, 34 CHKs | | | |
|---|---|---|---|---|
| | Bias method | | Generic method | |
| No. of case | Column Std. Dev. (pixel) | Row Std. Dev. (pixel) | Column Std. Dev. (pixel) | Row Std. Dev. (pixel) |
| 1 | 4.22 | 7.88 | 0.86 | 1.29 |
| 2 | 0.85 | 1.50 | 0.88 | 1.13 |
| 3 | 0.86 | 1.15 | 0.87 | 1.13 |
| 4 | 0.87 | 1.13 | 0.87 | 1.14 |
| 5 | 0.87 | 1.13 | 0.87 | 1.13 |
| 6 | 0.87 | 1.137 | 0.86 | 1.13 |
| 7 | 4.20 | 7.97 | 0.86 | 1.21 |
| 8 | 0.85 | 1.51 | 0.88 | 1.13 |
| 9 | 0.86 | 1.15 | 0.87 | 1.13 |

TABLE 6

Accuracy comparison between the Bias method and Generic method by using 7 GCP and 30 CHK points in 9 cases.

| | 7 GCP, 30 CHKs | | | |
|---|---|---|---|---|
| | Bias method | | Generic method | |
| No. of case | Column Std. Dev. (pixel) | Row Std. Dev. (pixel) | Column Std. Dev. (pixel) | Row Std. Dev. (pixel) |
| 1 | 4.02 | 6.71 | 0.97 | 1.25 |
| 2 | 0.95 | 1.39 | 0.97 | 1.15 |
| 3 | 0.95 | 1.15 | 0.95 | 1.15 |
| 4 | 0.95 | 1.16 | 0.95 | 1.15 |
| 5 | 0.95 | 1.15 | 0.95 | 1.15 |
| 6 | 0.95 | 1.15 | 0.95 | 1.15 |
| 7 | 3.99 | 6.79 | 0.98 | 1.18 |
| 8 | 0.95 | 1.39 | 0.97 | 1.15 |
| 9 | 0.95 | 1.15 | 0.95 | 1.15 |

From Tables 4 to 6, it is evident that the Bias Compensation method is very good at detecting ephemeris data error and can work well under a variety of different ephemeris error, but with increasing attitude error, use of the Bias Compensation method becomes progressively less feasible. This is particularly obvious in case 1 and case 7 when the attitude error is greater than 0.01 radius (Tables 5, 6) where the RMSE of column and row for the Bias Compensation method ranges from about 4 to 7 pixels. In contrast to this, the Generic method is very stable in that the RMSE remains about 1 pixel under a variety of different cases.

Unlike the Bias Compensation method which is defined in image space, the Generic method according to embodiments of the present invention is defined in object space. It directly modifies the RPC coefficients, but it does not require any supplemental information about RPC, such as the covariance matrices, like other direct methods.

The Generic method simulates the sensor's imaging geometry and can be used to adjust the camera's position and attitude. Therefore, it can effectively refine the RPC under a variety of different conditions. As position and attitude errors increase, the Bias Compensation method becomes less effective. Especially when the attitude error is greater than 0.01 radiuses, the RMSE of column and row error for the Bias Compensation method ranges from about 4 to 7 pixels. In contrast to this, the Generic method according to embodiments of the invention is very stable under a variety of different conditions. Even when the attitude error is greater than 0.01 radiuses, the RMSE always remains about 1 pixel. The Generic method overcomes drawbacks and limitations of the Bias Compensation method. It can be used regardless of the sensor's field of view, attitude error or position error.

It will be understood by those skilled in the art that Generic methods according to embodiments of the invention can be used to refine not only the RPCs of high-resolution satellite images, but also other generic sensor models, such as airborne wide-angle cameras, large off-nadir angles, and different satellite data. Generic methods according to embodiments of the invention can also be used in conjunction with bundle adjustment methods for aerial triangulation.

It will be appreciated by those skilled in the art that the present invention is not limited to particular software, system or network architectures or configurations. The methods and processes described above may be embodied in sequences of machine-executable instructions which, when executed by a machine, cause the machine to perform the actions of the methods of processes. The machine that executes the instructions may be a general-purpose or special-purpose processor. By way of example, the machine-executable instructions may be stored on a number of machine-readable media, such as CD-ROMs or other types of optical disks, floppy diskettes, ROMs, RAMs, EPROMs, EEPROMs, magnetic or optical cards, flash memory, or other types of machine-readable media that are suitable for storing electronic instructions. The methods and processes disclosed herein could also be performed by a combination of both hardware and software.

The above-described embodiments of the present invention are intended to be examples only. Those of skill in the art may effect alterations, modifications, and variations to the particular embodiments without departing from the scope of the invention, which is set forth in the claims.

REFERENCES

Bang Ki In, Soo Jeong, Kyung-Ok Kim. (2003). "Modification of sensor model parameters with a few GCP."*ASPRS 2003 annual conference proceedings*, May 2003, Anchorage, Ak.

Chen Liang-Chien, Tee-Ann Teo, and Chien-Liang Liu. (2006). "The geometrical comparisons of RSM and RFM for FORMOSAT-2 satellite images."*Photogrammetric Engineering & Remote Sensing*, Vol. 72, No. 5, pp. 573-579.

Di Kaichang, Ruijin Ma, and Rong Xing Li. (2003). "Rational functions and potential for rigorous sensor model recovery." *Photogrammetric Engineering & Remote Sensing*, Vol. 69, No. 1, pp. 33-41.

Dial Gene and Grodecki Jacek. (2002$^a$). "Block adjustment with rational polynomial camera models."*ACSM-ASPRS 2002 annual conference proceedings.*

Dowman Ian and Vincent Tao. (2002). "An Update on the use of rational functions for photogrammetric restitution." *ISPRS Article, Vol. 7, No., 3, September* 2002. URL: http://www.isprs.org/publications/highlights/highlights0703/22_HL_09_02 Article_Dowman.pdf, last date accessed 6 Jan. 2008.

Fraser Clive S. and Harry B. Hanley. (2003). "Bias Compensation in Rational Functions for Ikonos Satellite Imagery." *Photogrammetric Engineering & Remote Sensing*, Vol. 69, No. 1, pp. 53-57.

Fraser Clive S. and Harry B. Hanley. (2005). "Bias-compensated RPCs for Sensor Orientation of High-resolution Satellite Imagery." *Photogrammetric Engineering & Remote Sensing*, Vol. 71, No. 8, pp. 909-915.

Grodecki Jacek and Gene Dial. (2003). "Block adjustment of high resolution satellite images described by rational polynomials." *Photogrammetric Engineering & Remote Sensing*, Vol. 69, No. 1, pp. 59-68.

Grodecki Jacek. (2001). "IKONOS stereo feature extraction-RPC approach." *Proceedings of ASPRS* 2001 *Conference*, St. Louis, Apr. 23-27, 2001. URL: http://www.geoeye.com/whitepapers_pdfs/2005/IKONOS%20Geometric%20Calibrations%20-%20ASPRS%202005%20_final.pdf, last date accessed 31 Dec. 2007.

Hu Yong and C. Vincent Tao. (2002). "Updating solutions of the rational function model using additional control information." *Photogrammetric Engineering & Remote Sensing*, Vol. 68, No. 7, pp. 715-723.

Hu Yong, Tao Vincent, Arie Croitoru. (2004). "Understanding the rational function model: methods and applications." URL: http://www.geoict.net/Resources/Publications/IAPRS2004_RFM2394.pdf, last date accessed 31 Dec. 2007.

Samadzadegan, F., A. Azizi, and A. Abootalebi, 2005. Automatic determination of the optimum generic sensor model based on genetic algorithm concepts, *Photogrammetric Engineering & Remote Sensing,* 71(3):277-288.

Tao C. Vincent and Yong Hu. (2001). "A comprehensive study of the rational function model for photogrammetric processing." *Photogrammetric Engineering & Remote Sensing*, Vol. 67, No. 12, pp. 1347-1357.

We claim:

1. A computer implemented method of adjusting original rational polynomial coefficients of an RPC model for an image acquired by an image sensor comprising:
   providing original rational polynomial coefficients associated with the image;
   calculating only in object space a pseudo position and attitude angles for the sensor using the original coefficients;
   providing at least one ground control point associated with the image;
   adjusting only in object space the pseudo position and attitude angles using the at least one ground control point; and,
   adjusting the original coefficients for the image using the adjusted pseudo position and attitude angles.

2. The method of claim 1 wherein the step of calculating the pseudo position and attitude angles comprises: calculating a pseudo sensor position and attitude angles for each ground control point.

3. The method of claim 2 wherein the step of adjusting the original coefficients for the image further comprises: generating cubic points using the adjusted pseudo position and attitude angles and generating a new RPC model using the cubic points.

4. The method of claim 1 further comprising: calculating a pseudo light ray for each ground control point using the coefficients where the pseudo light ray approximates a light ray existing when the image was acquired by the sensor, and deriving the pseudo position and attitude for the sensor using the pseudo light ray where the pseudo position and attitude angles approximate the position and angles of the sensor when the image was acquired.

5. The method of claim 4 further comprising:
   selecting an image point, corresponding to each ground control point, on the image;
   assigning a first elevation value to the image point;
   calculating a ground position for a first ground point corresponding to the image point using the first elevation value;
   assigning a second elevation value to the image point where the second elevation value is greater than the first elevation value;
   calculating a ground position for a second ground point corresponding to the image point using the second elevation value;
   assigning a sensor height value;
   calculating a first vector from the first ground point to the second ground point using the sensor height value where the vector represents the pseudo light ray and calculating the pseudo sensor position using the first vector;
   and calculating a second vector from the first vector and calculating a rotation angle in the x-direction and a rotation angle in the y-direction using the first vector and assigning a value of approximately zero to a rotation angle in the z-direction where the rotation angles represent the pseudo angles of the sensor.

6. The method of claim 5 wherein adjusting the pseudo position and attitude angles comprises calculating a linear polynomial equation.

7. The method of claim 6 wherein adjusting the original coefficients comprises calculating the ground positions for the first and second ground points using an iterative method.

8. The method of claim 7 further comprising using the adjusted coefficients for geometric correction of the image.

9. A computer software product for use on a computer system, the computer software product comprising:
   a non-transitory computer readable storage medium,
   computer program code means stored on the computer readable storage medium,
   the computer program code means comprising encoded instructions that, when executed by the computer system, cause the computer system to execute steps of the method of claim 1.

10. The computer implemented method of claim 9 wherein the computer program code means further comprises encoded instruction that, when executed by the computer system, cause the computer system to execute the steps of the method of claim 6.

11. The method of claim 1 wherein adjusting the pseudo position and attitude angles further comprises calculating a linear polynomial equation.

12. The method of claim 11 wherein the step of adjusting the original coefficients for the image further comprises: generating cubic points using the adjusted pseudo position and attitude angles and generating a new RPC model using the cubic points.

13. A computer implemented method of adjusting coefficients of an RPC sensor model defining a position and attitude for a sensor comprising:
- providing an image point from the image acquired by the sensor;
- calculating two corresponding ground points for the image point at two different elevations;
- calculating a first vector between the ground points;
- calculating a position of the sensor comprising extending the first vector to a height of the sensor;
- calculating a second vector using the first vector;
- calculating two rotation angles using the second vector;
- calculating only in object space a pseudo position of the sensor using the first and second vectors; and
- adjusting the coefficients using the pseudo position and the rotation angles.

14. A computer implemented method of adjusting RPC values for an image sensor comprising:
- calculating only in object space, a position and an attitude for one or more ground control points from the RPC values;
- providing a ground control point from an image acquired by the sensor;
- calculating only in object space a pseudo sensor position and attitude corresponding to the ground control point;
- adjusting only in object space the sensor's position and attitude using the pseudo position and attitude; and
- adjusting the RPC values using the adjusted sensor position and attitude.

* * * * *